(12) United States Patent
Shi et al.

(10) Patent No.: US 11,671,223 B2
(45) Date of Patent: *Jun. 6, 2023

(54) METHOD FOR SIGNAL TRANSMISSION, NETWORK DEVICE AND TERMINAL DEVICE

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 154 days.

This patent is subject to a terminal disclaimer.

(21) Appl. No.: 17/161,629

(22) Filed: Jan. 28, 2021

(65) Prior Publication Data
US 2021/0152398 A1 May 20, 2021

Related U.S. Application Data

(63) Continuation of application No. 16/724,140, filed on Dec. 20, 2019, now Pat. No. 10,944,598, which is a
(Continued)

(51) Int. Cl.
*H04W 4/00* (2018.01)
*H04L 5/00* (2006.01)
(Continued)

(52) U.S. Cl.
CPC .......... *H04L 5/0051* (2013.01); *H04L 1/0026* (2013.01); *H04L 25/0226* (2013.01);
(Continued)

(58) Field of Classification Search
CPC . H04L 5/0051; H04L 1/0026; H04L 25/0226; H04L 27/2613; H04L 5/0094;
(Continued)

(56) References Cited

U.S. PATENT DOCUMENTS

| | | | | |
|---|---|---|---|---|
| 8,891,598 B1* | 11/2014 | Wang | ...... | H04B 7/08 455/39 |
| 2009/0046674 A1* | 2/2009 | Gao | ...... | H04L 5/0048 370/337 |

(Continued)

FOREIGN PATENT DOCUMENTS

| | | |
|---|---|---|
| CN | 102684835 A | 9/2012 |
| CN | 103428758 A | 12/2013 |

(Continued)

OTHER PUBLICATIONS

International Search Report in the international application No. PCT/CN2017/108419, dated Jun. 28, 2018.
(Continued)

*Primary Examiner* — Stephen M D Agosta
(74) *Attorney, Agent, or Firm* — Perkins Coie LLP

(57) ABSTRACT

Disclosed in the embodiments of the present application are a method for transmitting a signal, a network device, and a terminal device, said method comprising: a network device sending, to a terminal device, a mapping relationship between at least one sounding reference signal (SRS) resource and/or at least one SRS resource group and a downlink reference signal. The method, the network device, and the terminal device of the embodiments of the present application are beneficial to improving the transmission performance of the system.

4 Claims, 3 Drawing Sheets

Related U.S. Application Data continuation of application No. PCT/CN2017/108419, filed on Oct. 30, 2017.

(51) Int. Cl.
    *H04W 76/11*     (2018.01)
    *H04W 76/27*     (2018.01)
    *H04L 1/00*     (2006.01)
    *H04L 25/02*     (2006.01)
    *H04L 27/26*     (2006.01)
    *H04W 56/00*     (2009.01)
    *H04W 72/1273*     (2023.01)
    *H04W 80/02*     (2009.01)

(52) U.S. Cl.
    CPC ....... *H04L 27/2613* (2013.01); *H04W 56/001* (2013.01); *H04W 72/1273* (2013.01); *H04W 76/11* (2018.02); *H04W 76/27* (2018.02); *H04W 80/02* (2013.01)

(58) Field of Classification Search
    CPC .... H04L 5/0048; H04L 5/005; H04W 56/001; H04W 72/1273; H04W 76/11; H04W 76/27; H04W 80/02; H04W 28/18; H04W 72/042; H04B 7/0626; H04B 7/0456; H04B 7/0617; H04H 20/59; H04J 11/005; H04J 13/0059; H04J 13/0074
    See application file for complete search history.

(56) References Cited

U.S. PATENT DOCUMENTS

| | | | |
|---|---|---|---|
| 2009/0046800 A1 | 2/2009 | Xu | |
| 2009/0316676 A1 | 12/2009 | Kolding | |
| 2010/0215114 A1* | 8/2010 | Kim | H04B 7/0613 375/267 |
| 2012/0113875 A1 | 5/2012 | Seppo | |
| 2012/0243431 A1* | 9/2012 | Chen | H04W 72/20 370/252 |
| 2013/0039199 A1* | 2/2013 | Liao | H04B 7/024 370/252 |
| 2013/0142163 A1* | 6/2013 | Liu | H04L 1/0028 370/329 |
| 2013/0148600 A1* | 6/2013 | Moulsley | H04B 7/0626 370/329 |
| 2013/0265962 A1 | 10/2013 | Ouchi | |
| 2013/0294381 A1* | 11/2013 | Wang | H04L 5/0051 370/329 |
| 2014/0126476 A1 | 5/2014 | Kang | |
| 2014/0226611 A1 | 8/2014 | Kang et al. | |
| 2014/0226622 A1 | 8/2014 | Beser | |
| 2014/0376356 A1* | 12/2014 | Park | H04L 5/0048 370/203 |
| 2015/0009951 A1 | 1/2015 | Josiam et al. | |
| 2015/0071195 A1 | 3/2015 | Park et al. | |
| 2015/0124726 A1 | 5/2015 | Ni et al. | |
| 2015/0249981 A1* | 9/2015 | Wu | H04L 1/0026 370/329 |
| 2015/0295671 A1* | 10/2015 | Na | H04B 7/0634 370/329 |
| 2015/0358059 A1* | 12/2015 | Kim | H04B 7/0617 370/329 |
| 2016/0006521 A1 | 1/2016 | Yoshimoto et al. | |
| 2016/0037550 A1 | 2/2016 | Barabell et al. | |
| 2016/0157218 A1 | 6/2016 | Nam et al. | |
| 2017/0033897 A1 | 2/2017 | Huang et al. | |
| 2017/0223675 A1 | 8/2017 | Dinan et al. | |
| 2017/0311321 A1 | 10/2017 | Kakishima et al. | |
| 2017/0366377 A1 | 12/2017 | Papasakellariou | |
| 2018/0027437 A1 | 1/2018 | Vitthaladevuni et al. | |
| 2018/0048366 A1 | 2/2018 | Sundararajan et al. | |
| 2018/0062724 A1 | 3/2018 | Onggosanusi et al. | |
| 2018/0139689 A1* | 5/2018 | Wang | H04L 5/0053 |
| 2019/0280837 A1 | 9/2019 | Sano et al. | |
| 2022/0174614 A1* | 6/2022 | Shi | H04W 52/367 |
| 2022/0248406 A1* | 8/2022 | Zhang | H04W 72/042 |

FOREIGN PATENT DOCUMENTS

| | | |
|---|---|---|
| CN | 106455094 A | 2/2017 |
| CN | 107294585 A | 10/2017 |
| RU | 2619265 C2 | 5/2017 |
| WO | 2014077741 A1 | 5/2014 |
| WO | 2015034311 A1 | 3/2015 |
| WO | 2017026762 A1 | 2/2017 |

OTHER PUBLICATIONS

Written Opinion of the International Search Authority in the international application No. PCT/CN2017/108419, dated Jun. 28, 2018.
Supplementary European Search Report in the European application No. 17930910.9, dated Jun. 15, 2020.
Ericsson: "UL MIMO for non-codebook based transmission", 3GPP Draft; R1-1716342 UL MIMO for Noncodebook Based Transmission, 3rd Generation Partnership Project (3GPP)Mobile Competence Centre; 650, Route Des Lucioles; F-06921 Sophia-Anti Polis Cedex Fra vol. RAN WG1, No. Nagoya, Japan; Sep. 18, 2017-Sep. 21, 2017 Sep. 12, 2017 (Sep. 12, 2017), XP051329931. [ retrieved on—Sep. 12, 2017] *section 2*.
Huawei et al.: "UL SRS design for beam management and CSI acquisition" 3GPP Draft; R1-1717307. 3rd Generation Partnership Project (3GPP), Mobilecompetence Centre; 650, Route Des Lucioles F-06921 Sophia-Anti Polis Cedex France, vol. RAN WG1, No. Prague, Czech Republic;Oct. 9, 2017-Oct. 13, 2017 Oct. 8, 2017 (Oct. 8, 2017), XP051340497. [ retrieved on Oct. 8, 2017] *section 2*.
First Office Action of the Chilean application No. 202000062, dated Jan. 20, 2021.
First Office Action of the Russian application No. 2019144405, dated Dec. 2, 2020.
First Office Action of the U.S. Appl. No. 16/724,140, dated Mar. 9, 2020.
Final Office Action of the U.S. Appl. No. 16/724,140, dated Jun. 29, 2020.
Huawei et al., WF on Non-Codebook based UL Transmission, 3GPP TSG RAN WG1 NR Ad Hoc Meeting R1-1715235 Prague, Czech Republic, Aug. 21-25, 2017 Agenda item—6.1.2.1.3.
Google Translation of prior art reference Yoo et al., WO2017026752(A1) Feb. 16, 2017, pp. 1-16.
Notice of Allowance of the U.S. Appl. No. 16/724,140, dated Aug. 25, 2020.
Notice of Allowance of the U.S. Appl. No. 16/724,140, dated Oct. 26, 2020.
Corrected Notice of Allowability of the U.S. Appl. No. 16/724,140, dated Jan. 6, 2021.
First Office Action of the Canadian application No. 3066933, dated Feb. 23, 2021.
Second Office Action of the Chilean application No. 202000062, dated Apr. 20, 2021.
Notice of Corrected Allowance of the U.S. Appl. No. 16/724,140, dated Jan. 6, 2021.
Notice of Corrected Allowance of the U.S. Appl. No. 16/724,140, dated Feb. 9, 2021.
Second Office Action of the Japanese application No. 2019-572162, dated Mar. 11, 2022. 8 pages with English translation.
Third Office Action of the Canadian application No. 3066933, dated Aug. 29, 2022. 8 pages.
First Office Action of the Israeli application No. 271360, dated Jul. 24, 2022. 3 pages.
Office Action of the Indian application No. 201917053972, dated Jun. 7, 2021. 5 pages with English translation.
Huawei et al., "WF on DL measurement RS indication for non-codebook based transmission for UL MIMO", 3GPP TSG RAN WG1 #90b R1-1719166, Oct. 17, 2017. 3 pages.
First Office Action of the Japanese application No. 2019-572162, dated Aug. 31, 2021. 8 pages with English translation.

(56) References Cited

OTHER PUBLICATIONS

First Office Action of the Taiwanese application No. 107138257, dated Oct. 28, 2021. 22 pages with English translation.
Second Office Action of the Canadian application No. 3066933, dated Nov. 5, 2021. 3 pages.
Supplementary European Search Report in the European application No. 21184671.2, dated Nov. 11, 2021. 5 pages.
First Office Action of the Korean application No. 10-2019-7038353, dated Nov. 15, 2021. 12 pages with English translation.
Guangdong OPPO Mobile Telecom "On SRS design for NR" 3GPP TSG RAN WG1 NR Ad-Hoc#2 R1-1710147, Qingdao, P.R. China, Jun. 27-30, 2017. 5 pages.
Huawei, HiSilicon "UL SRS design for CSI acquisition and beam management" 3GPP TSG RAN WG1 NR Ad Hoc Meeting R1-1700074, Spokane, USA, Jan. 16-20, 2017. 8 pages.
First Office Action of the Chinese application No. 202010072074 1, dated Nov. 1, 2022. 12 pages with English translation.
Second Office Action of the Chinese application No. 202010072074. 1, dated Mar. 17, 2023. 10 pages with English translation.

\* cited by examiner

METHOD FOR SIGNAL TRANSMISSION, NETWORK DEVICE AND TERMINAL DEVICE

CROSS-REFERENCES TO RELATED APPLICATIONS

This application is a continuation of U.S. patent application Ser. No. 16/724,140, filed on Dec. 20, 2019, which is a continuation of and claims priority to International Patent Application PCT/CN2017/108419, filed on Oct. 30, 2017, the contents of which are hereby incorporated by reference in their entirety

TECHNICAL FIELD

Embodiments of the present disclosure relate to the field of communications, and more particularly to a method for signal transmission, a network device and a terminal device.

BACKGROUND

For Multiple-Input Multiple-Output (MIMO)-technology-based transmission solution design for a physical uplink shared channel (PUSCH) in a New Radio (NR) system, non-codebook-based uplink (UL) MIMO means that a terminal estimates downlink channel information according to a downlink reference signal of a network, calculates pre-coding information of a sounding reference signal (SRS) according to the downlink channel information, and then transmits the UL SRS according to the calculated UL pre-coding information. For downlink, there may be various downlink reference signals, and the terminal does not know the specific downlink reference signal to be used for calculating pre-coding information of an SRS to be transmitted, which reduces system transmission performance.

SUMMARY

In view of this, the embodiments of the application provide a method for signal transmission, a network device and a terminal device, which are favorable for improving system transmission performance.

A first aspect provides a method for signal transmission, which may include that: a network device transmits a mapping relationship between at least one SRS resource and/or at least one SRS resource group and a downlink reference signal to a terminal device.

A mapping relationship between an SRS and a downlink reference signal is notified to the terminal device, and then the terminal device may subsequently know the specific downlink reference signal to be used for calculating pre-coding information of an SRS to be transmitted, thus facilitating improvement in system transmission performance.

In a possible implementation mode, the operation that the network device transmits the mapping relationship between the at least one SRS resource and the downlink reference signal to the terminal device may include that: the network device transmits configuration information of each of the at least one SRS resource to the terminal device, the configuration information of each SRS resource including an indication field used to indicate the downlink reference signal corresponding to the SRS resource.

In a possible implementation mode, the operation that the network device transmits the mapping relationship between the at least one SRS resource group and the downlink reference signal to the terminal device may include that: the network device transmits configuration information of each of the at least one SRS resource group to the terminal device, the configuration information of each SRS resource group including at least one indication field used to indicate the downlink reference signal corresponding to SRS resources in the SRS resource group.

In a possible implementation mode, the indication field may specifically be used to indicate an identifier of the downlink reference signal or used to indicate configuration information of the downlink reference signal.

In a possible implementation mode, the operation that the network device transmits, to the terminal device, at least one of the following: the mapping relationship between at least one sounding reference signal (SRS) resource and the downlink reference signal, or the mapping relationship between at least one SRS resource group and the downlink reference signal, may include that: the network device transmits a mapping combination to the terminal device through Radio Resource Control (RRC) signaling or Media Access Control (MAC) signaling, the mapping combination including the mapping relationship between the at least one SRS resource and the downlink reference signal and/or the mapping relationship between the at least one SRS resource group and the downlink reference signal.

In a possible implementation mode, the mapping combination may further include at least one state identifier, and each of the at least one state identifier may be used to identify the mapping relationship between each of the at least one SRS resource and the respective downlink reference signal in a one-to-one correspondence manner; or, the mapping combination may further include the at least one state identifier, and each of the at least one state identifier may be used to identify the mapping relationship between each of the at least one SRS resource group and the respective downlink reference signal in the one-to-one correspondence manner.

In a possible implementation mode, the method may further include that: the network device transmits first indication information to the terminal device, the first indication information being used to trigger the terminal device to transmit a first SRS with the mapping relationship to the network device.

In a possible implementation mode, the first indication information may be used to indicate the first SRS and/or the downlink reference signal corresponding to the first SRS.

In a possible implementation mode, the method may further include that: the network device transmits second indication information to the terminal device, the second indication information being used to indicate a first state identifier in the at least one state identifier, the first state identifier being used to trigger the terminal device to transmit an SRS with the mapping relationship identified by the first state identifier to the network device.

In a possible implementation mode, the operation that the network device transmits, to the terminal device, at least one of the following: the mapping relationship between at least one Sounding Reference Signal (SRS) resource and the downlink reference signal, or the mapping relationship between at least one SRS resource group and the downlink reference signal, may include that: the network device transmits a first timing relationship between the at least one SRS resource and a resource for transmitting the downlink reference signal to the terminal device, the first timing relationship being used to indicate the mapping relationship between the at least one SRS resource and the downlink reference signal; and/or the network device transmits a second timing relationship between the at least one SRS resource group and the resource for transmitting the downlink reference signal to the terminal device, the second timing relationship being used to indicate the mapping relationship between the at least one SRS resource group and the downlink reference signal.

In a possible implementation mode, the operation that the network device transmits, to the terminal device, at least one of the following: the mapping relationship between at least one Sounding Reference Signal (SRS) resource and the downlink reference signal, or the mapping relationship between at least one SRS resource group and the downlink reference signal, may include that: the network device transmits a third timing relationship between a triggering signal for transmitting an SRS on the at least one SRS resource and the downlink reference signal to the terminal device, the third timing relationship being used to indicate the mapping relationship between the at least one SRS resource and the downlink reference signal; and/or the network device transmits a fourth timing relationship between a triggering signal for transmitting an SRS on the at least one SRS resource group and the downlink reference signal to the terminal device, the fourth timing relationship being used to indicate the mapping relationship between the at least one SRS resource group and the downlink reference signal.

In a possible implementation mode, the downlink reference signal may include a channel state information-reference signal (CSI-RS) and/or a synchronization signal block (SSB).

In a possible implementation mode, the SRS may include at least one of an aperiodic SRS, a periodic SRS and a semi-persistent SRS.

A second aspect provides a method for signal transmission, which may include that: a terminal device receives a mapping relationship between at least one SRS resource and/or at least one SRS resource group and a downlink reference signal from a network device.

In a possible implementation mode, the operation that the terminal device receives the mapping relationship between the at least one SRS resource and the downlink reference signal from the network device may include that: the terminal device receives configuration information of each of the at least one SRS resource from the network device, the configuration information of each SRS resource including an indication field used to indicate the downlink reference signal corresponding to the SRS resource.

In a possible implementation mode, the operation that the terminal device receives the mapping relationship between the at least one SRS resource group and the downlink reference signal from the network device may include that: the terminal device receives configuration information of each of the at least one SRS resource group from the network device, the configuration information of each SRS resource group including at least one indication field used to indicate the downlink reference signal corresponding to SRS resources in the SRS resource group.

In a possible implementation mode, the indication field may specifically be used to indicate an identifier of the downlink reference signal or used to indicate configuration information of the downlink reference signal.

In a possible implementation mode, the operation that the terminal device receives, from the network device, at least one of the following: the mapping relationship between at least one Sounding Reference Signal (SRS) resource and the downlink reference signal, the mapping relationship between at least one SRS resource group and the downlink reference signal, may include that: the terminal device receives a mapping combination from the network device through RRC signaling or MAC signaling, the mapping combination including the mapping relationship between the at least one SRS resource and the downlink reference signal and/or the mapping relationship between the at least one SRS resource group and the downlink reference signal.

In a possible implementation mode, the mapping combination may further include at least one state identifier, and each of the at least one state identifier may be used to identify the mapping relationship between each of the at least one SRS resource and the respective downlink reference signal in a one-to-one correspondence manner; or, the mapping combination may further include the at least one state identifier, and each of the at least one state identifier may be used to identify the mapping relationship between each of the at least one SRS resource group and the respective downlink reference signal in the one-to-one correspondence manner.

In a possible implementation mode, the method may further include that: the terminal device receives first indication information from the network device, the first indication information being used to trigger the terminal device to transmit a first SRS with the mapping relationship to the network device; the terminal device determines the downlink reference signal corresponding to the first SRS according to the first indication information and the mapping relationship; the terminal device calculates precoding information of the first SRS according to the downlink reference signal corresponding to the first SRS; and the terminal device transmits the first SRS to the network device according to the precoding information.

In a possible implementation mode, the first indication information may be used to indicate the first SRS and/or the downlink reference signal corresponding to the first SRS.

In a possible implementation mode, the method may further include that: the terminal device receives second indication information from the network device, the second indication information being used to indicate a first state identifier in the at least one state identifier.

The terminal device determines the first SRS corresponding to the first state identifier and the downlink reference signal corresponding to the first SRS according to the first state identifier and a mapping table; the terminal device calculates the precoding information of the first SRS according to the downlink reference signal corresponding to the first SRS; and the terminal device transmits the first SRS to the network device according to the precoding information.

In a possible implementation mode, the operation that the terminal device receives, from the network device, at least one of the following: the mapping relationship between at least one Sounding Reference Signal (SRS) resource and the downlink reference signal, or the mapping relationship between at least one SRS resource group and the downlink reference signal, may include that: the terminal device receives a first timing relationship between the at least one SRS resource and a resource for transmitting the downlink reference signal from the network device, the first timing relationship being used to indicate the mapping relationship between the at least one SRS resource and the downlink reference signal; and/or the terminal device receives a second timing relationship between the at least one SRS resource group and the resource for transmitting the downlink reference signal from the network device, the second timing relationship being used to indicate the mapping relationship between the at least one SRS resource group and the downlink reference signal.

In a possible implementation mode, the operation that the terminal device receives, from the network device, the mapping relationship between at least one Sounding Reference Signal (SRS) resource and the downlink reference signal, or the mapping relationship between at least one SRS resource group and the downlink reference signal, may include that: the terminal device receives a third timing relationship between a triggering signal for transmitting an SRS on the at least one SRS resource and the downlink reference signal from the network device, the third timing relationship being used to indicate the mapping relationship between the at least one SRS resource and the downlink reference signal; and/or the terminal device receives a fourth timing relationship between a triggering signal for transmitting an SRS on the at least one SRS resource group and the downlink reference signal from the network device, the fourth timing relationship being used to indicate the mapping relationship between the at least one SRS resource group and the downlink reference signal.

In a possible implementation mode, the downlink reference signal may include a CSI-RS and/or an SSB.

In a possible implementation mode, the SRS may include at least one of an aperiodic SRS, a periodic SRS and a semi-persistent SRS.

A third aspect provides a network device, which is configured to execute the method in the first aspect or any possible implementation mode of the first aspect. Specifically, the network device includes units configured to execute the method in the first aspect or any possible implementation mode of the first aspect.

A fourth aspect provides a terminal device, which is configured to execute the method in the second aspect or any possible implementation mode of the second aspect. Specifically, the terminal device includes units configured to execute the method in the second aspect or any possible implementation mode of the second aspect.

A fifth aspect provides a network device, which includes a memory, a processor, an input interface and an output interface. Herein, the memory, the processor, the input interface and the output interface are connected through a bus system. The memory is configured to store instructions. The processor is configured to execute the instructions stored in the memory to execute the method in the first aspect or any possible implementation mode of the first aspect.

A sixth aspect provides a terminal device, which includes a memory, a processor, an input interface and an output interface. Herein, the memory, the processor, the input interface and the output interface are connected through a bus system. The memory is configured to store instructions. The processor is configured to execute the instructions stored in the memory to execute the method in the second aspect or any possible implementation mode of the second aspect.

A seventh aspect provides a computer storage medium, which is configured to store computer software instructions for executing the method in the first aspect or any possible implementation mode of the first aspect or the method in the second aspect or any possible implementation mode of the second aspect and includes a program designed to execute the abovementioned aspects.

An eighth aspect provides a computer program product including an instruction, which runs on a computer to enable the computer to execute the method in the first aspect or any optional implementation mode of the first aspect or the method in the second aspect or any optional implementation mode of the second aspect.

These aspects or other aspects of the application will become clearer and easier to understand through the following descriptions about the embodiments.

DETAILED DESCRIPTION

Figure 1:
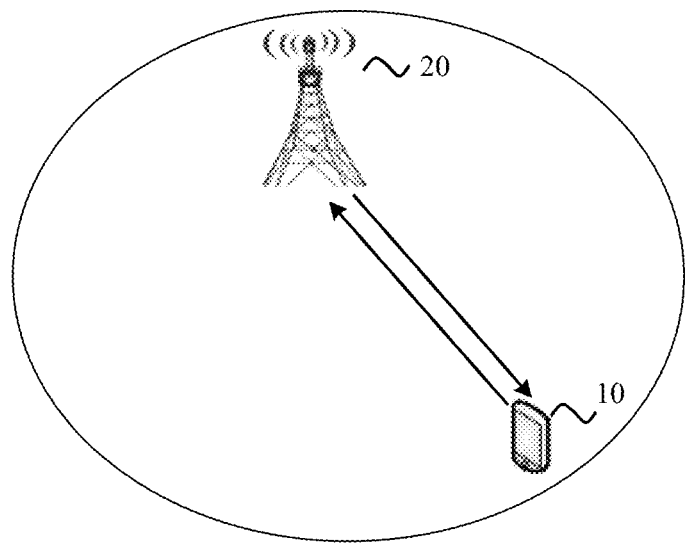
FIG. 1 illustrates a schematic diagram of an application scenario according to an embodiment of the application.

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile communication (GSM), a Code Division Multiple Access (CDMA) system, a Wideband Code Division Multiple Access (WCDMA) system, a General Packet Radio Service (GPRS), a Long Term Evolved (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, NR or a future 5th-Generation (5G) system.

Particularly, the technical solutions of the embodiments of the application may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the application may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the application, a terminal device may refer to User

Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, UE in a future 5G network, UE in a future evolved Public Land Mobile Network (PLMN) or the like. There are no limits made in the embodiments of the application.

In the embodiments of the application, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like. There are no limits made in the embodiments of the application.

FIG. 1 illustrates a schematic diagram of an application scenario according to an embodiment of the application. The communication system in FIG. 1 may include a terminal device 10 and a network device 20. The network device 20 is configured to provide a communication service for the terminal device 10 for access to a core network. The terminal device 10 searches for synchronization signals, broadcast signals and the like transmitted by the network device 20 to access the network, thereby communicating with the network. Arrows illustrated in FIG. 1 may represent uplink/downlink transmission implemented through a cellular link between the terminal device 10 and the network device 20.

For MIMO-technology-based transmission solution design for PUSCH in NR, there are two main types of transmission solutions. One is codebook-based UL MIMO, in which UE transmits SRSs of multiple ports, a network selects a specified codebook from a codebook set for notification to the UE according to a measurement result of the SRSs, and the UE precodes data for transmission according to the received specified codebook. The other is non-codebook-based UL MIMO, which is directed to true channel reciprocity. The UE estimates downlink channel information according to a downlink signal of the network, and calculates a UL precoding matrix according to the downlink channel information. For example, the UE may support 4-port UL transmission, and the UE may calculate one precoding matrix (four-dimensional) or four one-dimensional precoding vectors. Then, the UE (sequentially or simultaneously) transmits SRSs of four single ports, each SRS being precoded by use of the precoding matrix or the precoding vectors before being transmitted, and the network indicates one or more SRSs according to a measurement result of the SRSs. The UE performs PUSCH transmission according to the indicated SRS. For example, if the network indicates a first SRS, the UE transmits one layer of PUSCH, and precoding thereof corresponds to the first SRS.

For downlink, there may be various downlink reference signals (for example, multiple network nodes transmit different CSI-RSs), and thus the UE needs to know the specific CSI-RS to be used. The application discloses a configuration method in such a scenario, which is favorable for improving system transmission performance.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is also to be understood that terms "mapping" and "association" in the disclosure may also usually be exchanged for use in the disclosure. For example, "mapping relationship" in the disclosure is actually an "association relationship".

Figure 2:
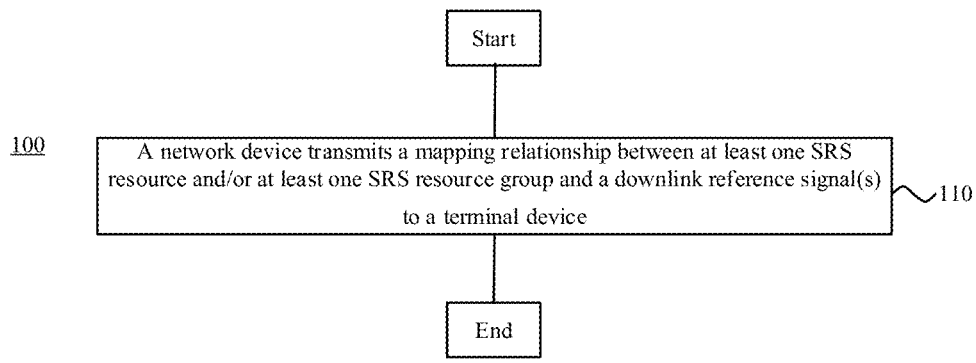
FIG. 2 illustrates a schematic block diagram of a method for signal transmission according to an embodiment of the application.

FIG. 2 illustrates a schematic block diagram of a method 100 for signal transmission according to an embodiment of the application. As illustrated in FIG. 2, the method 100 includes part or all of the following contents.

In S110, a network device transmits a mapping relationship between at least one SRS resource and/or at least one SRS resource group and a downlink reference signal(s) to a terminal device.

Specifically, the network device may configure a mapping relationship between an SRS(s) and a downlink reference signal(s) for the terminal device. The SRS may be a periodic SRS, or may be an aperiodic SRS, or may be a semi-persistent SRS. The downlink reference signal may be a CSI-RS, or may be an SSB and the like. SRSs transmitted on different SRS resources are usually different signals. In other words, each of different SRSs may be represented by a respective SRS resource for transmitting the SRS. The network device may pre-configure the at least one SRS resource or the at least one SRS resource group. The network device may further associate one of the at least one SRS resource with a respective downlink reference signal. Specifically, the network device may associate each of the at least one SRS resource with a respective downlink reference signal. For example, the network device configures totally three SRS resources, i.e., an SRS resource 0, an SRS resource 1 and an SRS resource 2, for the terminal device, the network device may further map the SRS resource 0 to a downlink reference signal 1, map the SRS resource 1 to a downlink reference signal 2 and map the SRS resource 2 to a downlink reference signal 2, and the network device may notify such a mapping relationship to the terminal device. The network device may also group the pre-configured SRS resources, for example, determining the SRS resource 0 as a group 1 and determining the SRS resource 1 and the SRS resource 2 as a group 2. The network device may further map the group 1 to the downlink reference signal 1 and map the group 2 to the downlink reference signal 2, and the network device may notify such a mapping relationship to the terminal device. The terminal device, after knowing the mapping relationship, may determine which downlink reference signal is to be used for calculating precoding information of an SRS to be transmitted, according to the mapping relationship.

In such a manner, according to the method for signal transmission in the embodiment of the application, the mapping relationship between the SRS(s) and the downlink reference signal(s) is notified to the terminal device, and then the terminal device may subsequently know the specific downlink reference signal to be used for calculating precoding information of an SRS to be transmitted, thus facilitating improvement in system transmission performance.

Alternatively, in the embodiment of the application, the operation that the network device transmits the mapping relationship between the at least one SRS resource and the downlink reference signal to the terminal device includes that: the network device transmits configuration information of each of the at least one SRS resource to the terminal device, the configuration information of each SRS resource including an indication field used to indicate the downlink reference signal corresponding to the SRS resource.

Specifically, after the terminal device establishes an RRC connection with the network device, the network device may configure a transmitting parameter for a UL reference signal for the terminal device. That is, the network device may transmit configuration information of the UL reference signal to the terminal device. For example, for an SRS, configuration information of the SRS may include parameters such as a bandwidth taken by the SRS, a transmitting period of the SRS (periodic SRS) and an initial frequency-domain offset for transmitting of the SRS, and these parameters define a radio resource (frequency-domain resource, time-domain resource, code-domain resource and the like) required for transmitting the SRS. In the embodiment of the application, the network device may configure each SRS resource for the terminal device, and the network device may indicate the downlink reference signal corresponding to the SRS resource by use of the configuration information of the SRS resource, i.e., a dedicated indication field in the configuration information of the SRS resource. In other words, the network device, at the same time of configuring a radio resource for a certain SRS for the terminal device, may configure the downlink reference signal corresponding to the SRS resource.

Alternatively, in the embodiment of the application, the operation that the network device transmits the mapping relationship between the at least one SRS resource group and the downlink reference signal to the terminal device includes that: the network device transmits configuration information of each of the at least one SRS resource group to the terminal device, the configuration information of each SRS resource group including at least one indication field used to indicate the downlink reference signal corresponding to SRS resources in the SRS resource group.

Specifically, the network device may also group multiple pre-allocated SRS resources and configure each group of SRS resources for the terminal device. That is, each group of SRS resources has a piece of configuration information. The network device may use the configuration information of each group of SRS resources, namely the configuration information of each group of SRS resources contains an indication field specially used to indicate the downlink reference signal corresponding to the SRS resources in the group of SRS resources, and there may be one or more indication fields. If there is one indication field, the terminal device may determine that all the SRS resources in a certain group of SRS resources correspond to the downlink reference signal indicated by the indication field; and if there are multiple indication fields, the terminal device may determine that part of SRS resources in a certain group of SRS resources correspond to the downlink reference signal indicated by a certain indication field in the multiple indication fields. It is to be understood that how to configure a mapping relationship between an SRS resource(s) in a group of SRS resources and a downlink reference signal(s) is not limited in the embodiment of the disclosure, all SRS resources in the group of SRS resources may be associated with one downlink reference signal, or part of SRS resources in the group of SRS resources may be associated with one downlink reference signal, or part of SRS resources in the group of SRS resources may be associated with no downlink reference signal.

Alternatively, in the embodiment of the application, the indication field is specifically used to indicate an identifier of the downlink reference signal or used to indicate configuration information of the downlink reference signal.

Specifically, the indication field may be the identifier of the downlink reference signal, for example, may be a resource identifier of the downlink reference signal, and may specifically be a CSI-RS resource index or an SSB resource index and the like. The indication field may also directly be configuration information of a certain downlink reference signal and, for example, may be a radio resource (frequency-domain resource, time-domain resource, code-domain resource and the like) configured by the network device for the downlink reference signal. When an indication field in configuration information of a certain SRS resource or configuration information of a certain group of SRS resources, received by the terminal device, indicates configuration information of a certain downlink reference signal, the terminal device may determine that the SRS resource or the group of SRS resources is associated with the downlink reference signal.

Alternatively, in the embodiment of the application, the operation that the network device transmits, to the terminal device, at least one of the following: the mapping relationship between at least one Sounding Reference Signal (SRS) resource and the downlink reference signal, or the mapping relationship between at least one SRS resource group and the downlink reference signal, includes that: the network device transmits a mapping combination to the terminal device through RRC signaling or MAC signaling, the mapping combination including the mapping relationship between the at least one SRS resource and the downlink reference signal(s) and/or the mapping relationship between the at least one SRS resource group and the downlink reference signal(s).

The network device may not contain, in configuration information of a certain SRS resource or a certain group of SRS resources, the downlink reference signal associated therewith. That is, the network device does not simultaneously configure the SRS resource and the mapping relationship between the SRS resource(s) and the downlink reference signal(s), and instead, the network device may configure the mapping relationship between the SRS resource(s) and the downlink reference signal(s) for the terminal device through individual signaling. For example, the network device may transmit a mapping combination to the terminal device through individual signaling, and the mapping combination may include a mapping relationship between multiple SRS resources and downlink reference signals and/or a mapping relationship between multiple SRS resource groups and downlink reference signals. In other words, the mapping combination may map the SRS resources in a group to one downlink reference signal, or may also map an individual SRS resource to one downlink reference signal.

Alternatively, in the embodiment of the application, the mapping combination further includes at least one state identifier, and each of the at least one state identifier is used to identify the mapping relationship between each of the at least one SRS resource and the respective downlink reference signal in a one-to-one correspondence manner; or, the mapping combination further includes the at least one state identifier, and each of the at least one state identifier is used to identify the mapping relationship between each of the at least one SRS resource group and the respective downlink reference signal in the one-to-one correspondence manner.

The mapping combination may be a mapping table, illustrated in Table 1.

TABLE 1

| State identifier 1 | SRS resource identifier 1 or SRS resource group identifier 1 | Downlink reference signal identifier 1 |
|---|---|---|
| State identifier 2 | SRS resource identifier 2 or SRS resource group identifier 2 | Downlink reference signal identifier 3 |
| State identifier 3 | SRS resource identifier 3 or SRS resource group identifier 3 | No associated downlink reference signal |

Specifically, as illustrated in Table 1, the network device may configure a state identifier for each mapping relationship, and once the terminal device acquires a certain state identifier, the terminal device may acquire the mapping relationship corresponding to the state identifier. For example, if the network device indicates a state identifier 1 to the terminal device, the terminal device may acquire a mapping relationship between an SRS resource identifier 1 or an SRS resource group identifier 1 and a downlink reference signal identifier 1 from Table 1, and the terminal device may further know the associated downlink reference signal according to an SRS resource for transmission indicated by the network device. It is to be understood that the mapping relationship identified by the state identifier may be the mapping relationship between the SRS resource and the downlink reference signal, and if a certain SRS resource or a certain group SRS resources is not associated with any downlink reference signal, it may also be considered as a mapping relationship, for example, a state identifier 3 in Table 3. There are no limits made thereto in the embodiment of the application.

The network device may transmit the mapping combination to the terminal device through high-layer signaling, for example, the RRC signaling or the MAC signaling. The network device may also transmit the mapping combination to the terminal device through a system message, a broadcast message and the like. The embodiment of the application is not limited thereto.

Alternatively, in the embodiment of the application, the method further includes that: the network device transmits first indication information to the terminal device, the first indication information being used to trigger the terminal device to transmit a first SRS with the mapping relationship to the network device.

From the above, it can be seen that the network device may trigger the terminal device to transmit an SRS on a certain SRS resource or transmit the SRS on a certain group of SRS resources and, after the terminal device knows the specific SRS resource or the specific group of SRS resources, the terminal device may acquire the corresponding downlink reference signal from each abovementioned mapping relationship, may further calculate precoding information of the SRS to be transmitted, and then transmits the SRS to the network device by use of the calculated precoding information. The network device may trigger transmitting of a certain SRS resource or SRS resource group through RRC signaling and/or MAC signaling and/or Downlink Control Information (DCI) signaling. The indication information may directly indicate the SRS resource for transmission, or may indirectly indicate some information related to the SRS resource for transmission, for example, the downlink reference signal associated with the SRS resource for transmission.

Alternatively, in the embodiment of the application, the method further includes that: the network device transmits second indication information to the terminal device, the second indication information being used to indicate a first state identifier in the at least one state identifier, the first state identifier being used to trigger the terminal device to transmit an SRS with the mapping relationship identified by the first state identifier to the network device.

Specifically, if the network device configures the mapping combination illustrated in Table 1 for the terminal device, the network device may directly indicate a certain state identifier to the terminal device, then the terminal device may acquire the SRS resource and downlink reference signal in the mapping relationship identified by the state identifier, and the terminal device may further know the SRS resource for transmission.

Alternatively, in the embodiment of the application, the operation that the network device transmits, to the terminal device, at least one of the following: the mapping relationship between at least one Sounding Reference Signal (SRS) resource and the downlink reference signal(s), or the mapping relationship between at least one SRS resource group and the downlink reference signal(s), includes that: the network device transmits a first timing relationship between the at least one SRS resource and a resource for transmitting the downlink reference signal to the terminal device, the first timing relationship being used to indicate the mapping relationship between the at least one SRS resource and the downlink reference signal(s); and/or the network device transmits a second timing relationship between the at least one SRS resource group and the resource for transmitting the downlink reference signal to the terminal device, the second timing relationship being used to indicate the mapping relationship between the at least one SRS resource group and the downlink reference signal(s).

Alternatively, in the embodiment of the application, the operation that the network device transmits, to the terminal device, at least one of the following: the mapping relationship between at least one Sounding Reference Signal (SRS) resource and the downlink reference signal(s), or the mapping relationship between at least one SRS resource group and the downlink reference signal(s), includes that: the network device transmits a third timing relationship between a triggering signal for transmitting an SRS on the at least one SRS resource and the downlink reference signal(s) to the terminal device, the third timing relationship being used to indicate the mapping relationship between the at least one SRS resource and the downlink reference signal(s); and/or the network device transmits a fourth timing relationship between a triggering signal for transmitting an SRS on the at least one SRS resource group and the downlink reference signal(s) to the terminal device, the fourth timing relationship being used to indicate the mapping relationship between the at least one SRS resource group and the downlink reference signal(s).

Specifically, in the embodiment of the application, the network device may also not directly configure the mapping relationship between the SRS resource(s) and the downlink reference signal(s), and the network device may configure a timing relationship between the SRS resource(s) and the downlink reference signal(s) for the terminal device to represent the mapping relationship between the SRS resource(s) and the downlink reference signal(s). For example, the network device and the terminal device may predetermine that each SRS resource may be considered to be associated with a downlink reference signal immediately previous to the SRS resource in time domain. Then, after the terminal device acquires the timing relationship between the SRS resource and the downlink reference signal, the terminal device may determine the downlink reference signal associated with a certain SRS resource according to a rule predetermined with the network device. Similarly, a timing relationship between an SRS resource group and a downlink reference signal may also represent the mapping relationship between the SRS resource group and the downlink reference signal. Elaborations are omitted herein.

The network device may also configure a timing relationship between the triggering signal for the SRS and the downlink reference signal for the terminal device, to represent the mapping relationship between the SRS resource and the downlink reference signal. For example, the network device and the terminal device may predetermine that the triggering signal for each SRS may be considered to be associated with a downlink reference signal immediately previous to the triggering signal in time domain. Then, after the terminal device acquires the timing relationship between the triggering signal for the SRS and the downlink reference signal, the terminal device may determine the downlink reference signal associated with a certain SRS resource according to a rule predetermined with the network device. Similarly, a timing relationship between a triggering signal of an SRS resource group and a downlink reference signal may also represent the mapping relationship between the SRS resource group and the downlink reference signal. Elaborations are omitted herein.

Figure 3:
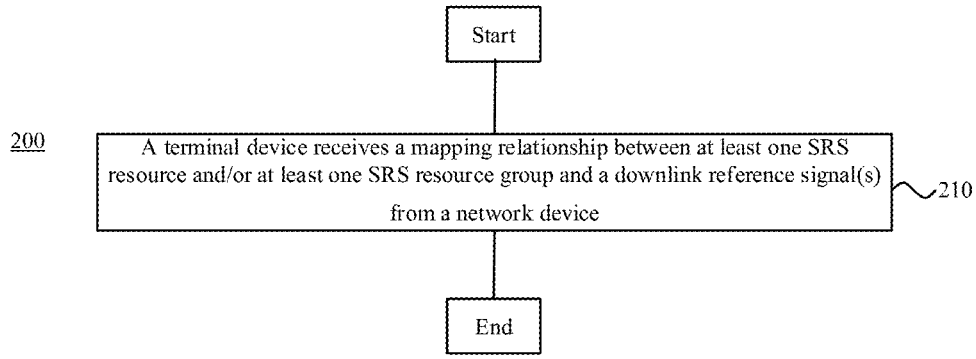
FIG. 3 illustrates another schematic block diagram of a method for signal transmission according to an embodiment of the application.

FIG. 3 illustrates a schematic block diagram of a method 200 for signal transmission according to an embodiment of the application. As illustrated in FIG. 3, the method 200 includes part or all of the following contents.

In S210, a terminal device receives a mapping relationship between at least one SRS resource and/or at least one SRS resource group and a downlink reference signal(s) from a network device.

In such a manner, according to the method for signal transmission in the embodiment of the application, a mapping relationship between an SRS(s) and a downlink reference signal(s) is notified to the terminal device, and then the terminal device may subsequently know the specific downlink reference signal to be used for calculating precoding information of an SRS to be transmitted, thus facilitating improvement in system transmission performance.

Alternatively, in the embodiment of the application, the operation that the terminal device receives the mapping relationship between the at least one SRS resource and the downlink reference signal(s) from the network device includes that: the terminal device receives configuration information of each of the at least one SRS resource from the network device, the configuration information of each SRS resource including an indication field used to indicate the downlink reference signal corresponding to the SRS resource.

Alternatively, in the embodiment of the application, the operation that the terminal device receives the mapping relationship between the at least one SRS resource group and the downlink reference signal(s) from the network device includes that: the terminal device receives configuration information of each of the at least one SRS resource group from the network device, the configuration information of each SRS resource group including at least one indication field used to indicate the downlink reference signal corresponding to SRS resources in the SRS resource group.

Alternatively, in the embodiment of the application, the indication field is specifically used to indicate an identifier of the downlink reference signal or used to indicate configuration information of the downlink reference signal.

Alternatively, in the embodiment of the application, the operation that the terminal device receives, from the network device, at least one of the following: the mapping relationship between at least one Sounding Reference Signal (SRS) resource and the downlink reference signal, or the mapping relationship between at least one SRS resource group and the downlink reference signal, includes that: the terminal device receives a mapping combination from the network device through RRC signaling or MAC signaling, the mapping combination including the mapping relationship between the at least one SRS resource and the downlink reference signal(s) and/or the mapping relationship between the at least one SRS resource group and the downlink reference signal(s).

Alternatively, in the embodiment of the application, the mapping combination further includes at least one state identifier, and each of the at least one state identifier is used to identify the mapping relationship between each of the at least one SRS resource and the respective downlink reference signal in a one-to-one correspondence manner; or, the mapping combination further includes the at least one state identifier, and each of the at least one state identifier is used to identify the mapping relationship between each of the at least one SRS resource group and the respective downlink reference signal in the one-to-one correspondence manner.

Alternatively, in the embodiment of the application, the method further includes that: the terminal device receives first indication information from the network device, the first indication information being used to trigger the terminal device to transmit a first SRS with the mapping relationship to the network device; the terminal device determines the downlink reference signal corresponding to the first SRS according to the first indication information and the mapping relationship; the terminal device calculates precoding information of the first SRS according to the downlink reference signal corresponding to the first SRS; and the terminal device transmits the first SRS to the network device according to the precoding information.

Alternatively, in the embodiment of the application, the first indication information is used to indicate the first SRS and/or the downlink reference signal corresponding to the first SRS.

Alternatively, in the embodiment of the application, the method further includes that: the terminal device receives second indication information from the network device, the second indication information being used to indicate a first state identifier in the at least one state identifier; the terminal device determines the first SRS corresponding to the first state identifier and the downlink reference signal corresponding to the first SRS according to the first state identifier and a mapping table; the terminal device calculates the precoding information of the first SRS according to the downlink reference signal corresponding to the first SRS; and the terminal device transmits the first SRS to the network device according to the precoding information.

Alternatively, in the embodiment of the application, the operation that the terminal device receives, from the network device, at least one of the following: the mapping relationship between at least one Sounding Reference Signal (SRS) resource and the downlink reference signal(s), or the mapping relationship between at least one SRS resource group and the downlink reference signal(s), includes that: the terminal device receives a first timing relationship between the at least one SRS resource and a resource for transmitting the downlink reference signal from the network device, the first timing relationship being used to indicate the mapping relationship between the at least one SRS resource and the downlink reference signal(s); and/or the terminal device receives a second timing relationship between the at least one SRS resource group and the resource for transmitting the downlink reference signal from the network device, the second timing relationship being used to indicate the mapping relationship between the at least one SRS resource group and the downlink reference signal(s).

Alternatively, in the embodiment of the application, the operation that the terminal device receives, from the network device, at least one of the following: the mapping relationship between at least one Sounding Reference Signal (SRS) resource and the downlink reference signal, the mapping relationship between at least one SRS resource group and the downlink reference signal, includes that: the terminal device receives a third timing relationship between a triggering signal for transmitting an SRS on the at least one SRS resource and the downlink reference signal(s) from the network device, the third timing relationship being used to indicate the mapping relationship between the at least one SRS resource and the downlink reference signal(s); and/or the terminal device receives a fourth timing relationship between a triggering signal for transmitting an SRS on the at least one SRS resource group and the downlink reference signal from the network device, the fourth timing relationship being used to indicate the mapping relationship between the at least one SRS resource group and the downlink reference signal(s).

Alternatively, in the embodiment of the application, the downlink reference signal includes a CSI-RS and/or an SSB.

Alternatively, in the embodiment of the application, the SRS includes at least one of an aperiodic SRS, a periodic SRS, or a semi-persistent SRS.

It is to be understood that interaction between the terminal device and the network device and related properties, functions and the like described from the terminal device correspond to related properties and functions of the network device. Moreover, the related contents have been described in detail in the method 100 and, for simplicity, will not be elaborated herein.

It is also to be understood that, in various embodiments of the application, a magnitude of a sequence number of each process does not mean an execution sequence and the execution sequence of each process should be determined by its function and an internal logic and should not form any limit to an implementation process of the embodiments of the application.

The method for signal transmission according to the embodiments of the application is described above in detail and a device for signal transmission according to the embodiments of the application will be described below in combination with FIG. 4 to FIG. 7. The technical characteristics described in the method embodiments are applied to the following device embodiments.

Figure 4:
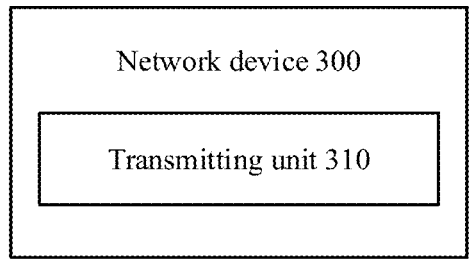
FIG. 4 illustrates a schematic block diagram of a network device according to an embodiment of the application.

FIG. 4 illustrates a schematic block diagram of a network device 300 according to an embodiment of the application. As illustrated in FIG. 4, the network device 300 includes a transmitting unit 310.

The transmitting unit 310 is configured to transmit a mapping relationship between at least one SRS resource and/or at least one SRS resource group and a downlink reference signal(s) to a terminal device.

In such a manner, according to the network device of the embodiment of the application, a mapping relationship between an SRS(s) and a downlink reference signal(s) is notified to the terminal device, and then the terminal device may subsequently know the specific downlink reference signal(s) to be used for calculating precoding information of an SRS(s) to be transmitted, thus facilitating improvement in system transmission performance.

Alternatively, in the embodiment of the application, the transmitting unit is specifically configured to transmit configuration information of each of the at least one SRS resource to the terminal device, the configuration information of each SRS resource including an indication field used to indicate the downlink reference signal corresponding to the SRS resource.

Alternatively, in the embodiment of the application, the transmitting unit is specifically configured to transmit, by the network device, configuration information of each of the at least one SRS resource group to the terminal device, the configuration information of each SRS resource group including at least one indication field used to indicate the downlink reference signal corresponding to SRS resources in the SRS resource group.

Alternatively, in the embodiment of the application, the indication field is specifically used to indicate an identifier of the downlink reference signal or used to indicate configuration information of the downlink reference signal.

Alternatively, in the embodiment of the application, the transmitting unit is specifically configured to transmit a mapping combination to the terminal device through RRC signaling or MAC signaling, the mapping combination including the mapping relationship between the at least one SRS resource and the downlink reference signal(s) and/or the mapping relationship between the at least one SRS resource group and the downlink reference signal(s).

Alternatively, in the embodiment of the application, the mapping combination further includes at least one state identifier, and each of the at least one state identifier is used to identify the mapping relationship between each of the at least one SRS resource and the respective downlink reference signal in a one-to-one correspondence manner; or, the mapping combination further includes the at least one state identifier, and each of the at least one state identifier is used to identify the mapping relationship between each of the at least one SRS resource group and the respective downlink reference signal in the one-to-one correspondence manner.

Alternatively, in the embodiment of the application, the transmitting unit is further configured to transmit first indication information to the terminal device, the first indication information being used to trigger the terminal device to transmit a first SRS with the mapping relationship to the network device.

Alternatively, in the embodiment of the application, the first indication information is used to indicate the first SRS and/or the downlink reference signal corresponding to the first SRS.

Alternatively, in the embodiment of the application, the transmitting unit is further configured to transmit, by the network device, second indication information to the terminal device, the second indication information being used to indicate a first state identifier in the at least one state identifier, the first state identifier being used to trigger the terminal device to transmit an SRS with the mapping relationship identified by the first state identifier to the network device.

Alternatively, in the embodiment of the application, the transmitting unit is specifically configured to: transmit a first timing relationship between the at least one SRS resource and a resource for transmitting the downlink reference signal to the terminal device, the first timing relationship being used to indicate the mapping relationship between the at least one SRS resource and the downlink reference signal(s); and/or transmit a second timing relationship between the at least one SRS resource group and the resource for transmitting the downlink reference signal to the terminal device, the second timing relationship being used to indicate the mapping relationship between the at least one SRS resource group and the downlink reference signal(s).

Alternatively, in the embodiment of the application, the transmitting unit is specifically configured to: transmit a third timing relationship between a triggering signal for transmitting an SRS on the at least one SRS resource and the downlink reference signal(s) to the terminal device, the third timing relationship being used to indicate the mapping relationship between the at least one SRS resource and the downlink reference signal(s); and/or transmit a fourth timing relationship between a triggering signal for transmitting an SRS on the at least one SRS resource group and the downlink reference signal(s) to the terminal device, the fourth timing relationship being used to indicate the mapping relationship between the at least one SRS resource group and the downlink reference signal(s).

Alternatively, in the embodiment of the application, the downlink reference signal includes a CSI-RS and/or an SSB.

Alternatively, in the embodiment of the application, the SRS includes at least one of an aperiodic SRS, a periodic SRS, or a semi-persistent SRS.

It is to be understood that the network device 300 according to the embodiment of the application may correspond to the network device in the method embodiment of the application and the abovementioned and other operations and/or functions of each unit in the network device 300 are adopted to implement the corresponding flows executed by the network device in the method in FIG. 2 respectively and will not be elaborated herein for simplicity.

Figure 5:
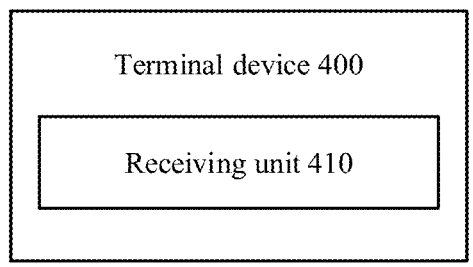
FIG. 5 illustrates a schematic block diagram of a terminal device according to an embodiment of the application.

FIG. 5 illustrates a schematic block diagram of a terminal device 400 according to an embodiment of the application. As illustrated in FIG. 5, the terminal device 400 includes a receiving unit.

The receiving unit is configured to receive a mapping relationship between at least one SRS resource and/or at least one SRS resource group and a downlink reference signal(s) from a network device.

In such a manner, according to the terminal device of the embodiment of the application, a mapping relationship, notified by the network device, between an SRS and a downlink reference signal(s) is received, and then the terminal device may subsequently know the specific downlink reference signal(s) to be used for calculating precoding information of an SRS(s) to be transmitted, thus facilitating improvement in system transmission performance.

Alternatively, in the embodiment of the application, the receiving unit is specifically configured to receive configuration information of each of the at least one SRS resource from the network device, the configuration information of each SRS resource including an indication field used to indicate the downlink reference signal corresponding to the SRS resource.

Alternatively, in the embodiment of the application, the receiving unit is specifically configured to receive configuration information of each of the at least one SRS resource group from the network device, the configuration information of each SRS resource group including at least one indication field used to indicate the downlink reference signal corresponding to SRS resources in the SRS resource group.

Alternatively, in the embodiment of the application, the indication field is specifically used to indicate an identifier of the downlink reference signal or used to indicate configuration information of the downlink reference signal.

Alternatively, in the embodiment of the application, the receiving unit is specifically configured to receive a mapping combination from the network device through RRC signaling or MAC signaling, the mapping combination including the mapping relationship between the at least one SRS resource and the downlink reference signal(s) and/or the mapping relationship between the at least one SRS resource group and the downlink reference signal(s).

Alternatively, in the embodiment of the application, the mapping combination further includes at least one state identifier, and each of the at least one state identifier is used to identify the mapping relationship between each of the at least one SRS resource and the respective downlink reference signal in a one-to-one correspondence manner; or, the mapping combination further includes the at least one state identifier, and each of the at least one state identifier is used to identify the mapping relationship between each of the at least one SRS resource group and the respective downlink reference signal in the one-to-one correspondence manner.

Alternatively, in the embodiment of the application, the receiving unit is further configured to receive first indication information from the network device, the first indication information being used to trigger the terminal device to transmit a first SRS with the mapping relationship to the network device. The terminal device further includes a first determination unit, a first calculation unit, and a transmitting unit. The first determination unit is configured to determine the downlink reference signal corresponding to the first SRS according to the first indication information and the mapping relationship. The first calculation unit is configured to calculate precoding information of the first SRS according to the downlink reference signal corresponding to the first SRS. The transmitting unit is configured to transmit the first SRS to the network device according to the precoding information.

Alternatively, in the embodiment of the application, the first indication information is used to indicate the first SRS and/or the downlink reference signal corresponding to the first SRS.

Alternatively, in the embodiment of the application, the receiving unit is further configured to receive second indication information from the network device, the second indication information being used to indicate a first state identifier in the at least one state identifier. The terminal device further includes a second determination unit, a second calculation unit, and a second transmitting unit. The second determination unit is configured to determine the first SRS corresponding to the first state identifier, and the downlink reference signal corresponding to the first SRS, according to the first state identifier and a mapping table. The second calculation unit is configured to calculate the precoding information of the first SRS according to the downlink reference signal corresponding to the first SRS. The second transmitting unit is configured to transmit the first SRS to the network device according to the precoding information.

Alternatively, in the embodiment of the application, the receiving unit is specifically configured to: receive a first timing relationship between the at least one SRS resource and a resource for transmitting the downlink reference signal from the network device, the first timing relationship being used to indicate the mapping relationship between the at least one SRS resource and the downlink reference signal(s); and/or receive a second timing relationship between the at least one SRS resource group and the resource for transmitting the downlink reference signal from the network device, the second timing relationship being used to indicate the mapping relationship between the at least one SRS resource group and the downlink reference signal(s).

Alternatively, in the embodiment of the application, the receiving unit is specifically configured to: receive a third timing relationship between a triggering signal for transmitting an SRS on the at least one SRS resource and the downlink reference signal from the network device, the third timing relationship being used to indicate the mapping relationship between the at least one SRS resource and the downlink reference signal(s); and/or receive a fourth timing relationship between a triggering signal for transmitting an SRS on the at least one SRS resource group and the downlink reference signal from the network device, the fourth timing relationship being used to indicate the mapping relationship between the at least one SRS resource group and the downlink reference signal(s).

Alternatively, in the embodiment of the application, the downlink reference signal includes a CSI-RS and/or an SSB.

Alternatively, in the embodiment of the application, the SRS includes at least one of an aperiodic SRS, a periodic SRS, or a semi-persistent SRS.

It is to be understood that the terminal device 400 according to the embodiment of the application may correspond to the terminal device in the method embodiment of the application and the abovementioned and other operations and/or functions of each unit in the terminal device 400 are adopted to implement the corresponding flows executed by the terminal device in the method in FIG. 3 respectively and will not be elaborated herein for simplicity.

Figure 6:
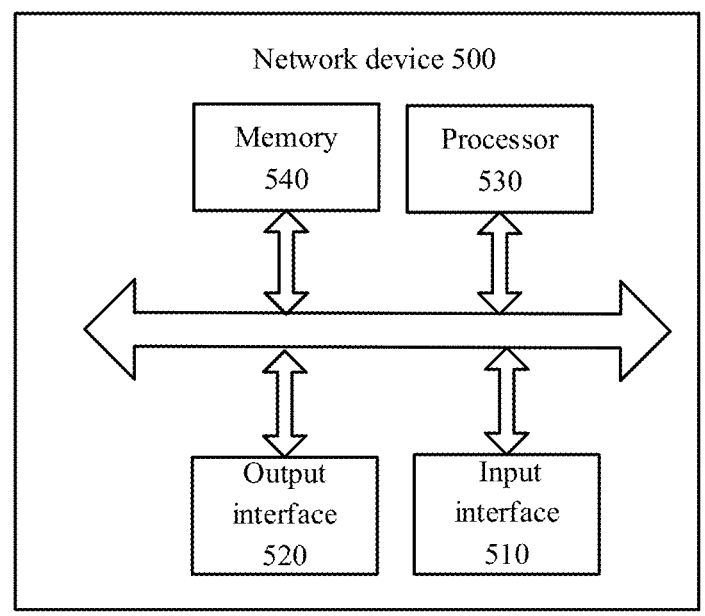
FIG. 6 illustrates another schematic block diagram of a network device according to an embodiment of the application.

As illustrated in FIG. 6, an embodiment of the application also provides a network device 500. The network device 500 may be the network device 300 in FIG. 4, and may be configured to execute contents of the network device corresponding to the method 100 in FIG. 2. The network device 500 includes an input interface 510, an output interface 520, a processor 530 and a memory 540. The input interface 510, the output interface 520, the processor 530 and the memory 540 may be connected through a bus system. The memory 540 is configured to store a program, instructions or a code. The processor 530 is configured to execute the program instructions or code in the memory 540 to control the input interface 510 to receive a signal, control the output interface 520 to transmit a signal and complete operations in the method embodiments.

In such a manner, according to the network device of the embodiment of the application, a mapping relationship between an SRS(s) and a downlink reference signal(s) is notified to a terminal device, and then the terminal device may subsequently know the specific downlink reference signal(s) to be used for calculating precoding information of an SRS(s) to be transmitted, thus facilitating improvement in system transmission performance.

It is to be understood that, in the embodiment of the application, the processor 530 may be a Central Processing Unit (CPU), or the processor 530 may be another universal processor, a digital signal processor, an application specific integrated circuit, a field-programmable gate array or another programmable logic device, discrete gate or transistor logic device and discrete hardware component and the like. The universal processor may be a microprocessor or the processor may also be any conventional processor and the like.

The memory 540 may include a Read-Only Memory (ROM) and a Random Access Memory (RAM) and provides an instruction and data for the processor 530. A part of the memory 540 may further include a nonvolatile RAM. For example, the memory 540 may further store information of a device type.

In an implementation process, each content of the method may be completed by an integrated logic circuit of hardware in the processor 530 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the contents of the method in combination with hardware. No more detailed descriptions will be made herein to avoid repetitions.

In a specific implementation mode, the transmitting unit in the network device 300 may be implemented by the output interface 520 in FIG. 6.

Figure 7:
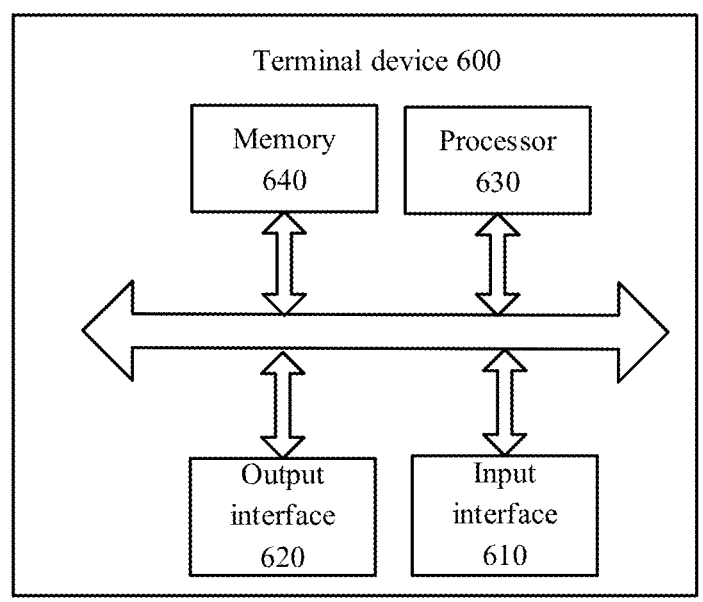
FIG. 7 illustrates another schematic block diagram of a terminal device according to an embodiment of the application.

As illustrated in FIG. 7, an embodiment of the application also provides a terminal device 600. The terminal device 600 may be the terminal device 400 in FIG. 5, and may be configured to execute contents of the terminal device corresponding to the method 200 in FIG. 3. The terminal device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program instruction or code in the memory 640 to control the input interface 610 to receive a signal, control the output interface 620 to transmit a signal and complete operations in the method embodiments.

In such a manner, according to the terminal device of the embodiment of the application, a mapping relationship, notified by a network device, between an SRS(s) and a downlink reference signal(s) is received, and then the terminal device may subsequently know the specific downlink reference signal(s) to be used for calculating precoding information of an SRS(s) to be transmitted, thus facilitating improvement in system transmission performance.

It is to be understood that, in the embodiment of the application, the processor 630 may be a CPU, or the processor 630 may be another universal processor, a digital signal processor, an application specific integrated circuit, a field-programmable gate array or another programmable logic device, discrete gate or transistor logic device and discrete hardware component and the like. The universal processor may be a microprocessor or the processor may be any conventional processor and the like.

The memory 640 may include a ROM and a RAM and provides an instruction and data for the processor 630. A part of the memory 640 may further include a nonvolatile RAM. For example, the memory 640 may further store information of a device type.

In an implementation process, each content of the method may be completed by an integrated logic circuit of hardware in the processor 630 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 640. The processor 630 reads information in the memory 640 and completes the contents of the method in combination with hardware. No more detailed descriptions will be made herein to avoid repetitions.

In a specific implementation mode, the receiving unit in the terminal device 400 may be implemented by the input interface 610 in FIG. 7, each determination unit and each calculation unit in the terminal device 400 may be implemented by the processor 630 in FIG. 7, and each transmitting unit in the terminal device 400 may be implemented by the output interface 620 in FIG. 7.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method, comprising:
   receiving from a network device, by a terminal device, a mapping relationship between a Sounding Reference Signal (SRS) resource group and a downlink reference signal through Radio Resource Control (RRC) signaling, wherein the mapping relationship comprises a state identifier, the state identifier identifying the mapping relationship between the SRS resource group and the downlink reference signal; and
   receiving from the network device, by the terminal device, indication information, the indication information indicating the state identifier, the state identifier being configured to trigger the terminal device to transmit an SRS with the mapping relationship identified by the state identifier to the network device,
   wherein receiving from the network device, by the terminal device, the mapping relationship between the SRS resource group and the downlink reference signal further comprises:
      receiving from the network device, by the terminal device, configuration information of the SRS resource group, the configuration information of the SRS resource group comprising at least one indication field indicating the downlink reference signal corresponding to SRS resources in the SRS resource group,
      the at least one indication field indicating an identifier of the downlink reference signal or indicating configuration information of the downlink reference signal,
      wherein the downlink reference signal comprises at least one of a channel state information-reference signal (CSI-RS) or a synchronization signal block (SSB), and
   wherein the SRS comprises at least one of an aperiodic SRS, a periodic SRS, or a semi-persistent SRS.

2. The method of claim 1, further comprising:
   determining, by the terminal device, the SRS corresponding to the state identifier, and the downlink reference signal corresponding to the SRS, according to the state identifier and a mapping table;
   calculating, by the terminal device, precoding information of the SRS according to the downlink reference signal corresponding to the SRS; and
   transmitting, by the terminal device, the SRS to the network device according to the precoding information.

3. A terminal device, comprising:

an input interface configured to receive, from a network device, a mapping relationship between a Sounding Reference Signal (SRS) resource group and a downlink reference signal through Radio Resource Control (RRC) signaling, wherein the mapping relationship comprises a state identifier, the state identifier identifying the mapping relationship between the SRS resource group and the downlink reference signal;

the input interface further configured to receive indication information from the network device, the indication information indicating the state identifier, the state identifier being configured to trigger the terminal device to transmit an SRS with the mapping relationship identified by the state identifier to the network device, the input interface further configured to receive configuration information of the SRS resource group from the network device, the configuration information of the SRS resource group comprising at least one indication field indicating the downlink reference signal corresponding to SRS resources in the SRS resource group, the at least one indication field indicating an identifier of the downlink reference signal or indicating configuration information of the downlink reference signal, wherein the downlink reference signal comprises at least one of a channel state information-reference signal (CSI-RS) or a synchronization signal block (SSB), and wherein the SRS comprises at least one of an aperiodic SRS, a periodic SRS, or a semi-persistent SRS.

4. The terminal device of claim 3, further comprising:

a processor, configured to determine the SRS corresponding to the state identifier, and the downlink reference signal corresponding to the SRS, according to the state identifier and a mapping table;

the processor further configured to calculate precoding information of the SRS according to the downlink reference signal corresponding to the SRS; and an output interface, configured to transmit the SRS to the network device according to the precoding information.

* * * * *